Patented Sept. 16, 1947

2,427,360

UNITED STATES PATENT OFFICE 2,427,360

METHOD OF TREATING MATERIAL CONTAINING COLUMBIUM AND TANTALUM

William J. Kroll, Albany, Oreg., and Frederick E. Bacon, Niagara Falls, N. Y., assignors to Electro Metallurgical Company, a corporation of West Virginia No Drawing. Application December 7, 1945, Serial No. 633,559

4 Claims. (Cl. 23—17)

This invention relates to the treatment of materials containing a mixture of columbium and tantalum compounds and refers more particularly to methods of recovering from such materials either a substantially tantalum-free columbium compound, a substantially columbium-free tantalum compound, or a mixture of columbium compound and tantalum compound in which the ratio of elemental columbium to elemental tantalum is substantially different from that in the starting material.

Columbium and tantalum almost invariably occur together in nature. Their separation one from the other is extremely difficult because of their similar chemical properties, and processes for their separate recovery are tedious and expensive. Because of the increasing use of these elements in industry, there is a demand for an improved, efficient method of recovering them separately from mixtures of their compounds. A particular demand exists in the metal industries for a product in which the ratio of elemental columbium to elemental tantalum is not less than ten to one.

It is the principal object of this invention to satisfy these demands. More specifically it is an object of the invention to produce a columbium compound contaminated by little or no tantalum from a mixture of compounds of columbium and tantalum.

The invention by means of which these objects are achieved is based on the discovery that under proper conditions the columbium in a mixture of columbium and tantalum compounds may be caused to combine selectively with nitrogen, leaving the tantalum compound substantially unaffected. The columbium nitride so formed may then be selectively halogenated with chlorine, bromine, iodine, or dissociable compounds thereof to produce a volatile halide of columbium which is readily separable from the tantalum compound by distillation and condensation. The invention, accordingly, is a method comprising the steps of selectively nitriding a columbium compound in a mixture of columbium and tantalum compounds and selectively halogenating the nitride of columbium thereby produced, followed by distillation and condensation of a volatile columbium halide.

In accordance with the invention, a mixture, preferable finely-divided, of the pentoxides of columbium and tantalum, derived for instance from an ore by conventional methods, is subjected to the action of a nitriding agent. A preferred nitriding agent is gaseous ammonia, but a mixture of hydrogen and nitrogen may be employed. By conducting the nitriding operation at temperatures in the range 500° C. to 800° C., utilizing gaseous ammonia, columbium pentoxide may be converted to columbium nitride according to the reaction:

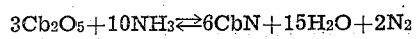

$$3Cb_2O_5 + 10NH_3 \rightleftharpoons 6CbN + 15H_2O + 2N_2$$

but the formation of tantalum nitride is prevented. If, during nitriding with ammonia the temperature rises to above 800° C., tantalum nitride will be formed and will contaminate the columbium nitride. A convenient operating temperature is in the neighborhood of 700° C.

If an uncombined mixture of nitrogen and hydrogen is used for nitriding, the temperature may rise to just below 900° C., for in such a mixture tantalum nitride is not formed until a temperature of about 900° C. is attained.

The nitriding operation is suitably conducted by passing the nitriding agent over the material to be treated which is held in an apparatus in which it may be heated. The operation should be conducted as quickly as possible to prevent a reaction between the columbium nitride formed and the tantalum pentoxide, by which reaction tantalum nitride is formed. An aid to quick nitriding is disposition of the material to be treated in shallow layers. This not only provides for more effective contact between the material and the nitriding agent but also decreases contact between columbium nitride and tantalum pentoxide.

After the nitriding step is completed, the material, now containing columbium nitride and tantalum pentoxide, is subjected to the action of a halogenating agent either chlorine, bromine, iodine, or a halogen-liberating compound, for example a dissociable halide such as ferric chloride. For convenience, gaseous chlorine is a preferred halogenating agent. When chlorine gas is employed, the operation is conducted at a temperature of about 400° C. to 600° C. by passing the gas over the heated material, the temperature being maintained as low as possible, consistent with the attainment of chlorination of columbium, to prevent reaction between columbium chloride and tantalum pentoxide.

Under the conditions just described, columbium chloride is formed by the reaction:

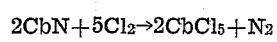

$$2CbN + 5Cl_2 \rightarrow 2CbCl_5 + N_2$$

The columbium chloride is volatile and may be recovered separately from the mixture by conventional distillation and condensation methods.

In the chlorination step it is advisable to dilute the chlorine gas with an inert gas such as nitrogen if the material treated is rich in columbium nitride. Columbium nitride may ignite spontaneously in a current of chlorine, and dilution of the gas serves to prevent such ignition.

Tests of the invention have shown it to be an effective method of removing columbium from mixtures of the pentoxides of columbium and tantalum, producing a columbium compound containing little or no tantalum and a residue rich in tantalum and containing only a minor proportion of columbium. For example, in one test a material containing about 47% columbium pentoxide and 49% tantalum pentoxide was nitrided by treatment with gaseous ammonia at temperature of about 700° C. and chlorinated with gaseous chlorine at a temperature of about 400° C. About 88% of the columbium pentoxide was converted to columbium chloride while less than 5% of the tantalum pentoxide was removed from the starting material. The residue contained about 10% columbium pentoxide and 88% tantalum pentoxide.

The method of the invention has advantages over prior methods of separating columbium from tantalum in that its reactions are easily controlled and may be conducted in simple apparatus. One prior method of treating mixed oxides of tantalum and columbium with which the invention may be compared comprises chlorinating such oxides at a temperature of 1050° C. This method has several disadvantages avoided by the invention. For example, the temperature of chlorination in the prior method is quite critical. If a temperature much above 1050° C. is attained, tantalum chloride is formed, contaminating the product. On the other hand, unless the temperature is maintained at or about 1050° C., little columbium oxide is halogenated. To add to the difficulty of temperature control, the reaction between columbium pentoxide and chlorine is exothermic, thereby tending to raise the temperature to above 1050° C. A further difficulty is that of providing and maintaining apparatus for chlorination at such high temperatures. The nitriding step in the method of this invention makes possible the use of the relatively low temperature of 400° C. to 600° C. in the halogenation step, and thus the disadvantages of the prior method are avoided.

Although in this description particular reference has been made to the use of specific nitriding and halogenating agents, the invention is not limited to the use of such agents. Furthermore although the starting material used is described as a mixture of the pentoxides of columbium and tantalum, mixtures of other compounds of these elements may be treated by the method of the invention by first converting the mixed compounds to their respective pentoxides. The nitriding and the halogenating steps can be carried out in the presence of noninterfering substances associated with the columbium-tantalum mixture.

We claim:

1. A method which comprises subjecting a material containing the pentoxides of both columbium and tantalum to the action of a nitriding agent, thereby selectively converting columbium pentoxide to columbium nitride; subjecting the columbium nitride so formed to the action of a halogenating agent, selected from the group consisting of chlorine, bromine, iodine, and dissociable compounds thereof, thereby selectively converting columbium nitride to a volatile halide of columbium; and then distilling and condensing said columbium halide apart from said tantalum pentoxide.

2. A method as claimed in claim 1 in which said nitriding agent is gaseous ammonia.

3. A method as claimed in claim 1 in which said halogenating agent is gaseous chlorine.

4. A method which comprises subjecting a finely-divided mixture of columbium pentoxide and tantalum pentoxide to the action of gaseous ammonia at a temperature of about 500° C. to 800° C., thereby converting columbium pentoxide to columbium nitride without forming tantalum nitride; subjecting said columbium nitride in admixture with said tantalum pentoxide to the action of gaseous chlorine, thereby converting said columbium nitride to volatile columbium chloride without forming any substantial quantity of tantalum chloride; and distilling and condensing said volatile columbium chloride apart from said tantalum pentoxide.

WILLIAM J. KROLL.
FREDERICK E. BACON.